United States Patent
Deb et al.

(10) Patent No.: US 11,050,794 B2
(45) Date of Patent: Jun. 29, 2021

(54) GENERATING SECURITY POLICIES FOR END-USER DEVICES USING GROUP RANKINGS AND PARTIAL POLICY DETERMINATIONS

(71) Applicant: EMC IP Holding Company LLC, Hopkinton, MA (US)

(72) Inventors: Shuva Brata Deb, Bengaluru (IN); Edward G. Quackenbush, Oakton, VA (US); Scott Volk, North Easton, MA (US); Kurt Severance, Maynard, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 201 days.

(21) Appl. No.: 16/521,083

(22) Filed: Jul. 24, 2019

(65) Prior Publication Data

US 2021/0029173 A1 Jan. 28, 2021

(51) Int. Cl.
*H04L 29/06* (2006.01)
*G06Q 10/06* (2012.01)

(52) U.S. Cl.
CPC ....... *H04L 63/205* (2013.01); *G06Q 10/0635* (2013.01); *H04L 63/102* (2013.01); *H04L 63/104* (2013.01)

(58) Field of Classification Search
CPC ... H04L 63/205; H04L 63/102; H04L 63/104; H04L 63/20; H04L 63/10; H04L 63/105; H04L 63/107; H04L 63/108; G06Q 10/0635
See application file for complete search history.

(56) References Cited

U.S. PATENT DOCUMENTS

| | | | |
|---|---|---|---|
| 10,142,362 B2 | 11/2018 | Weith et al. | |
| 2002/0059471 A1* | 5/2002 | Sanghvi | G06F 9/542 719/318 |
| 2010/0125911 A1 | 5/2010 | Bhaskaran | |
| 2010/0222902 A1 | 9/2010 | Weith et al. | |
| 2014/0115693 A1* | 4/2014 | Schieman | G06F 21/6218 726/17 |
| 2018/0077260 A1* | 3/2018 | Faltyn | H04M 1/72448 |

* cited by examiner

*Primary Examiner* — Edward Zee
(74) *Attorney, Agent, or Firm* — Ryan, Mason & Lewis, LLP (57) ABSTRACT

Methods, apparatus, and processor-readable storage media for generating security policies for end-user devices using group rankings and partial policy determinations are provided herein. An example computer-implemented method includes ranking end-user device groups within an enterprise, wherein each of the groups is associated with one or more security-related policy settings; assigning a given end-user device to two or more of the groups based on device parameters attributed to the given end-user device; generating a policy for the given end-user device by performing partial policy determinations across the two or more groups to which the given end-user device is assigned, wherein performing the partial policy determinations comprises defining, in an order based at least in part on the ranking of the groups, security-related settings from the two or more groups, until all security-related settings required by the policy are defined; and outputting the policy to the given end-user device.

20 Claims, 6 Drawing Sheets

FIG. 2

| DEFAULT POLICY | |
|---|---|
| PRIMARY SERVER NAME | 123.0.0.1 |
| SECONDARY SERVER NAME | 123.0.0.1 |
| CHANNELS | SYSTEM, SECURITY, APPLICATION |
| FILTERS | NULL |
| PROTOCOL | TCP |
| BLOCKING ENABLED | FALSE |
| SMTP SERVER | 123.0.0.1 |

GENERATING SECURITY POLICIES FOR END-USER DEVICES USING GROUP RANKINGS AND PARTIAL POLICY DETERMINATIONS

FIELD

The field relates generally to information processing systems, and more particularly to techniques for providing security in such systems.

BACKGROUND

As part of gaining device and log visibility, enterprises (including companies and other organizations) often attempt to manage devices and log sources. However, such data sources can plausibly be significant in number and/or volume, thereby presenting analysis and management challenges. Additionally, enterprises can encounter a need to configure different devices in accordance with one or more enterprise needs and/or policy requirements. Further, for some devices, such enterprise needs and/or policy requirements can overlap or be in conflict, creating additional time- and labor-intensive challenges.

SUMMARY

Illustrative embodiments of the disclosure provide techniques for generating security policies for end-user devices using group rankings and partial policy determinations. An exemplary computer-implemented method includes ranking a set of multiple end-user device groups within at least one enterprise, wherein each of the multiple end-user device groups is associated with one or more security-related policy settings. Such a method also includes assigning a given end-user device to two or more of the multiple end-user device groups based at least in part on one or more device parameters attributed to the given end-user device, and generating a policy for the given end-user device by performing partial policy determinations across the two or more end-user device groups to which the given end-user device is assigned, wherein performing the partial policy determinations comprises defining, in an order based at least in part on the ranking of the multiple end-user device groups, security-related settings from the two or more end-user device groups, until all security-related settings required by the policy are defined. Further, such a method includes outputting the policy to at least the given end-user device.

Illustrative embodiments can provide significant advantages relative to conventional cross-group security policy coordination techniques. For example, challenges associated with uncertainty arising from conflicting policy requirements for given devices are overcome through ranking device groups according to one or more determined priorities, and performing partial policy determinations across overlapping and/or conflicting group policies by defining policy settings dynamically based at least in part on the rankings of the groups to which a given device is assigned.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
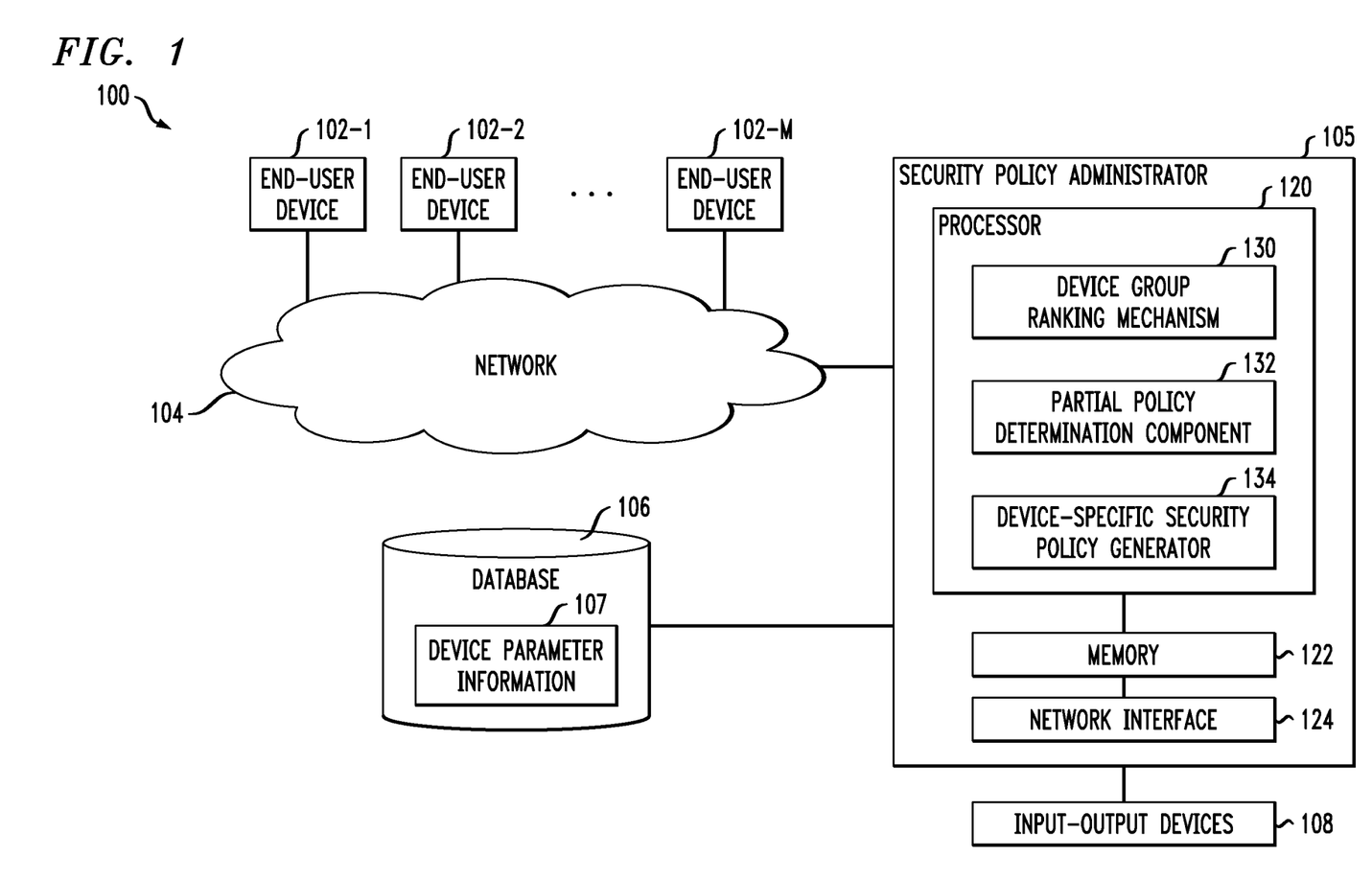
FIG. 1 shows an information processing system configured for multi-group end-user security policy generation in an illustrative embodiment.

FIG. 1 shows a computer network (also referred to herein as an information processing system) 100 configured in accordance with an illustrative embodiment. The computer network 100 comprises a plurality of end-user devices 102-1, 102-2, ... 102-M, collectively referred to herein as end-user devices 102. The end-user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is security policy administrator 105.

The end-user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The end-user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the security policy administrator 105 can have an associated database 106 configured to store data 107 pertaining to device parameter information, which comprise, for example, geographic location information, operating system information, enterprise-related purpose information, internet protocol address information, etc.

The database 106 in the present embodiment is implemented using one or more storage systems associated with the security policy administrator 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the security policy administrator 105 are input-output devices 108, which illustratively comprise keyboards, displays or other types of input-output devices in any combination. Such input-output devices can be used, for example, to support one or more user interfaces to the security policy administrator 105, as well as to support communication between the security policy administrator 105 and other related systems and devices not explicitly shown.

The security policy administrator 105 in the FIG. 1 embodiment is assumed to be implemented using at least one processing device. Each such processing device generally comprises at least one processor and an associated memory, and implements one or more functional modules for controlling certain features of the security policy administrator 105.

More particularly, the security policy administrator 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the security policy administrator 105 to communicate over the network 104 with the end-user devices 102, and illustratively comprises one or more conventional transceivers.

The processor 120 further comprises a device group ranking mechanism 130, a partial policy determination component 132, and a device-specific security policy generator 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the device group ranking mechanism 130, partial policy determination component 132, and device-specific security policy generator 134 may be implemented at least in part in the form of software that is stored in memory 122 and executed by processor 120.

It is to be understood that the particular set of elements shown in FIG. 1 for multi-group end-user security policy generation involving end-user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing device group ranking mechanism 130, partial policy determination component 132, and device-specific security policy generator 134 of the security policy administrator 105 in computer network 100 will be described in more detail with reference to the flow diagram of FIG. 5.

Figure 2:
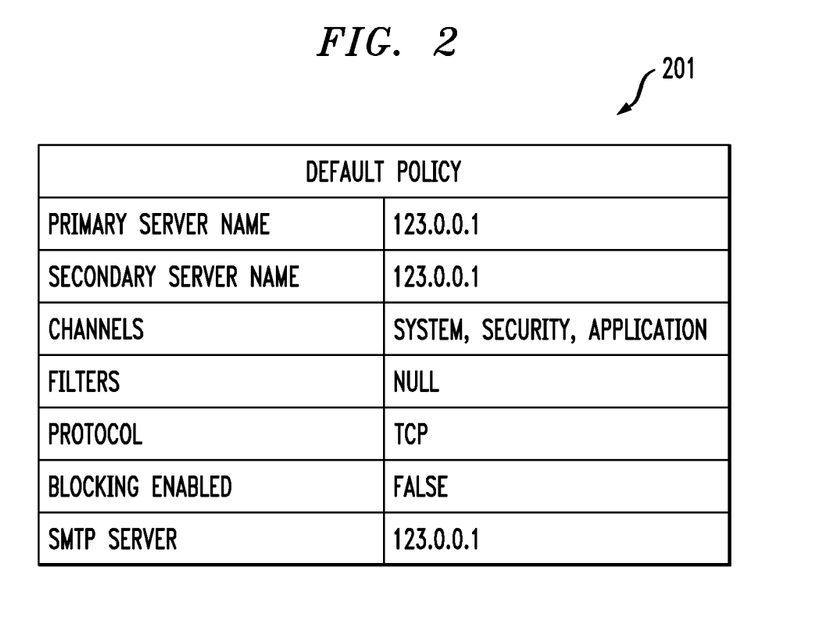
FIG. 2 shows an example policy representation in an illustrative embodiment.

As used herein, a policy (such as a security policy, for example) is a named persistent configuration that includes a set of discrete settings. The policy defines the behavior of the data source (such as an end-user device, for example). By way merely of illustration, a policy may contain settings such as, for example, primary server name, secondary server name, channels, filters, protocol, blocking enabled, etc. FIG. 2 shows an example policy representation 201 in an illustrative embodiment.

As also used herein, a group refers to a logical collection of data sources defined by some criteria. An example criterion might be defined, for instance, by IP address, classless inter-domain routing (CIDR), or lightweight directory access protocol (LDAP) query. Additionally, such criteria dictating variations in device configurations can also be due to factors such as, for example, geographic location of the device (e.g., a device in the United States may require a different security policy than a device in India), operating system (OS) of the device (e.g., configurations may vary due to OS capabilities), and the substantive and/or enterprise-related purpose of the device (e.g., a production active-directory may require a different level of visibility than a user laptop).

In one or more example implementations of at least one embodiment, administrators in enterprises or other organizations onboard new data sources (such as end-user devices, for example). As the administrators deploy a product over a given period of time, a potentially complex setup of logical groups can be created, wherein each group has varying requirements. By way merely of example, FIG. 3 shows an example arrangement of logical groups each with varying requirements in an illustrative embodiment.

Figure 3:
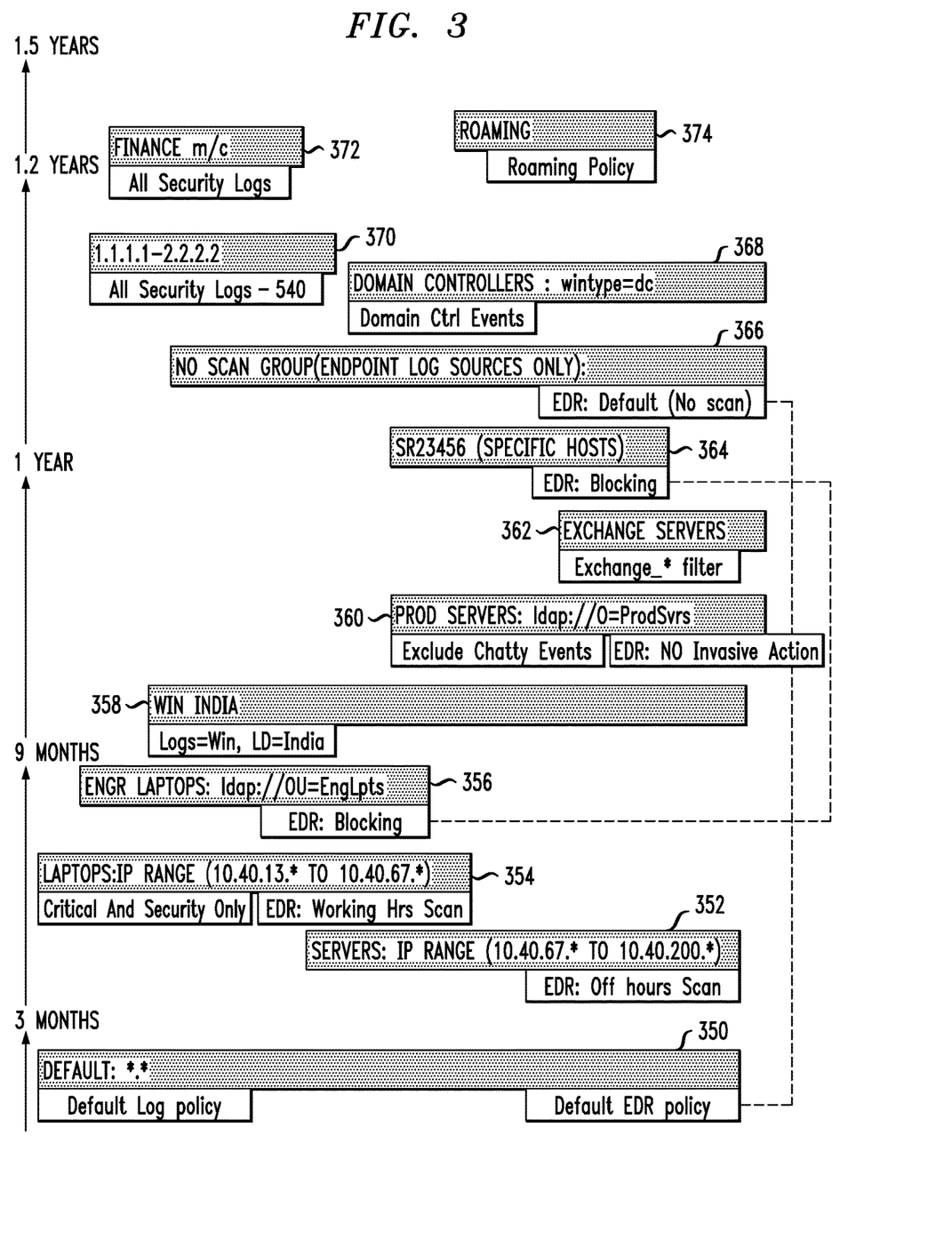
FIG. 3 shows an example arrangement of logical groups each with varying requirements in an illustrative embodiment.

By way of illustration FIG. 3 depicts an example deployment starting from a default log policy and EDR policy associated with a default group 350, which contains all data sources. The temporal progression of the example deployment is illustrated on the left-hand portion of the figure, noted vertically in a range of 3 months to 1.5 years. Accordingly, over time, based on enterprise requirements, different data sources require changes in policy. Additionally, per the illustration in FIG. 3, the width of the horizontal bars (each representing a distinct group with one or more associated policy settings) is intended as an approximate estimation of the number of possible data sources subscribed thereto. Also, as depicted, the groups often overlap with other groups, as it is not always possible and/or practical to define mutually exclusive groups that align with various enterprise objectives.

As such, moving from the bottom of the illustration to the top (in accordance with the noted temporal progression), the other depicted groups in FIG. 3 include a group of servers 352 having a specific IP address range, a group of laptops 354 having a specific IP address range, a group of engineering laptops 356 having particular LDAP attributes, a group of Windows servers located in India 358, a group of production servers 360 having particular LDAP attributes, a group of Exchange servers 362, a group of specific hosts 364, a group of only endpoint log sources 366, a group of domain controllers 368, a group related to domain name systems 370, a group related to finance-related tasks 372, and a roaming group 374.

In analyzing a deployment such as the example depicted in FIG. 3, consider the following. For instance, devices in the "Exchange Servers" group 362 also fall into the "Production Servers" group 360, and as such, there are policy settings for production servers that should also apply to Exchange servers. Additionally, in such an embodiment, while all devices in a particular geo-location report to the relevant region-specific server, the Exchange servers in that and other geo-locations is to collect Exchange-specific logs.

Accordingly, and as detailed herein, one or more embodiments include advantages over conventional approaches such as, for example, moving away from a solution that offers a single-group-to-single-policy association, in favor of a solution that allows a more flexible group-to-policy association. Additionally, such embodiments include maintaining policy changes over time with minimal changes to the system, displaying the effective policy for any given data source, and automatically applying a new policy to a data source if the data source changes one or more relevant attributes (such as IP address, geo-location, etc.).

Specifically, one or more embodiments provide a solution based at least in part on a ranking aspect and a partial policy determination aspect. As further detailed herein, ranking includes defining a rank for at least a portion of a set of logical groups. In one or more embodiments, a higher rank indicates that the given group is a possible sub-group to one or more lower-ranked group. By way merely of example, "Exchange Servers" can represent a sub-group that could be ranked higher than "Windows Server," while "Linux Servers" may be ranked lower or higher than "Windows Servers," as those data sources may not overlap. By way of additional example, if a set of groups are all in a given geo-location (e.g., the United States), a lower-ranked group identified as "US Servers" can be established.

With respect to partial policy determinations, one or more embodiments include defining only particular settings within a policy, while leaving the remaining settings to be determined dynamically based on the group rankings of the groups to which the given data source belongs. Additionally, in at least one embodiment, to ensure that a data source obtains a complete policy with all required settings, a default policy, which includes all such settings configured, is established and implemented.

Figure 4:
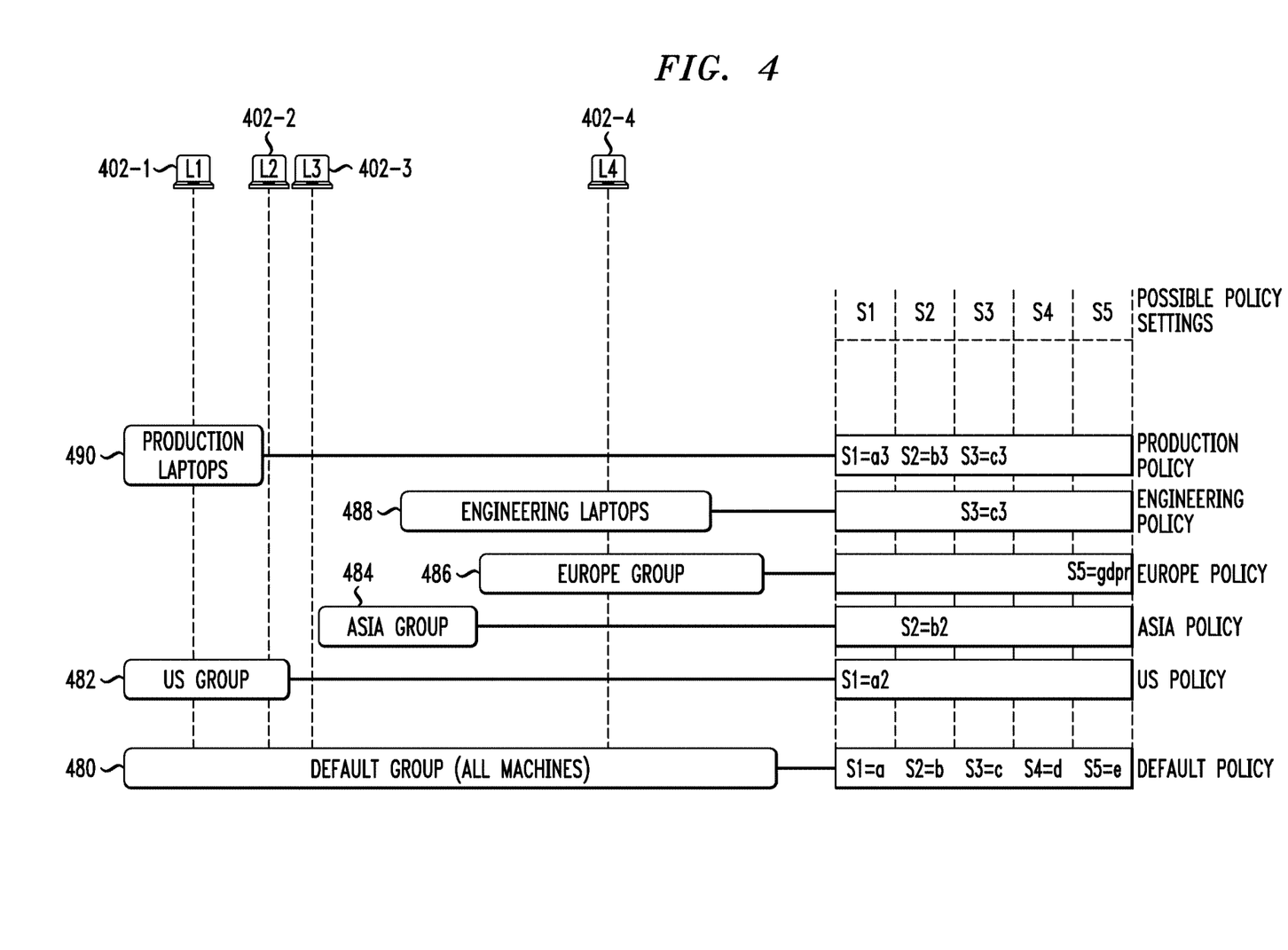
FIG. 4 shows a ranking and partial policy generation example among a set of devices in an illustrative embodiment.

By way merely of example, FIG. 4 shows a ranking and partial policy generation example among a set of devices in an illustrative embodiment. By way of illustration, FIG. 4 depicts the variable policy in question encompassing five possible settings: S1, S2, S3, S4 and S5. A default policy (associated with default group 480, which includes all machines/devices) defines all five of these settings. Any data source (e.g., end-user device such as an enterprise-issued laptop) that is not part of any group can, for example, consume the default policy.

As also illustrated in FIG. 4, "US Group" 482 is a logical group of laptops defined via attributes of the data source, which can be based, for example, on an IP address range. The "US Policy" associated with "US Group" 482 requires only the S1 setting, and which is set as S1=a2. Also, the "Asia Policy" associated with "Asia Group" 484 requires only the S2 setting, and which is set as S2=b2. Additionally, the "Europe Policy" associated with "Europe Group" 486 requires only the S5 setting, and which is set as S5=GDPR (General Data Protection Regulation). The "Engineering Policy" associated with "Engineering Laptops Group" 488 requires only the S3 setting, and which is set as S3=c3. Further, the "Production Policy" associated with "Production Laptops Group" 490 requires only the S1, S2, and S3 settings, and which are set as S1=a3, S2=b3, and S3=c3.

As also depicted in FIG. 4, four data sources (representing, for example, four laptops), L1 402-1, L2 402-2, L3 402-3 and L4 402-4, are illustrated above the various groups to which they are assigned. Specifically, L1 402-1 is assigned to the Production Laptops Group 490, the US Group 482, and the Default Group 480. As such, the generated (security) policy for L1 402-1 is S1=a3, S2=b3, S3=c3, S4=d, and S5=e. In order to make this policy assessment, the herein-described aspects of ranking and partial policy determinations are implemented. With respect to L1 402-1, the partial policy determination begins with the highest-ranked group, Production Laptops Group 490, and defines the settings associated therewith (i.e., S1, S2, and S3). With respect, then, to the two remaining settings (i.e., S4 and S5), first the partial policy determination technique would look to the next highest-ranked group, US Group 482, however, those settings are not defined by the US policy. As such, the partial policy determination techniques continues to the next highest-ranked group, Default Group 480, and defines the S4 and S5 settings associated therewith. Accordingly, all five settings are thereby defined for the (security) policy generated specifically for L1 402-1.

Referring to L2 402-2, this data source is assigned to the US Group 482 and the Default Group 480. As such, the generated (security) policy for L2 402-2 is S1=a2, S2=b, S3=c, S4=d, and S5=e. Also, L3 402-3 is assigned only to the Default Group 480. As such, the generated (security) policy for L3 402-3 is S1=a, S2=b, S3=c, S4=d, and S5=e. Further, L4 402-4 is assigned to the Engineering Laptops Group 488, the Europe Group 486, and the Default Group 480. As such, the generated (security) policy for L4 402-4 is S1=a, S2=b, S3=c3, S4=d, and S5=GDPR.

As detailed in connection with FIG. 4, one or more embodiments include carrying out a policy evaluation, which includes the process of considering multiple policies in a group-rank order until a full policy with all settings is derived for a given data source (e.g., end-user device). In at least one embodiment, a policy evaluation is performed every time a data source changes one or more relevant attributes in a manner sufficient to update the group subscription attributed thereto. By way merely of example, if a laptop is relocated from the United States to Asia, the IP address of that laptop may change, potentially triggering a new policy evaluation.

Accordingly, one or more embodiments, in contrast to conventional approaches, include generating less duplication of settings across an enterprise environment, as well as enabling implementation independent of the number of policies created in the enterprise environment. Additionally, at least one embodiment includes reverting a temporary policy. By way of example, assume a use case wherein an administrator was instructed to disable internet access for ten specific laptops for a given number of days. In such a situation, the administrator can create a group, rank the group highest among all relevant groups, and disable internet access as a setting for the group. Additionally, after the given number of days, the administrator can delete the group, reverting the laptops to the last known (acceptable) configuration.

Figure 5:
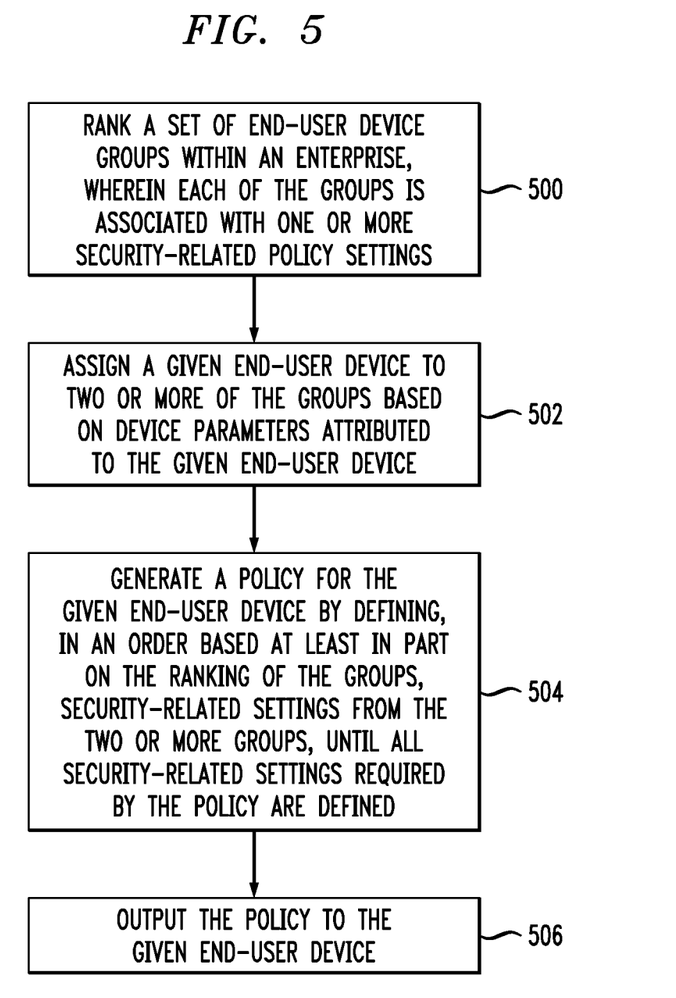
FIG. 5 is a flow diagram of a process for multi-group end-user security policy generation in an illustrative embodiment.

FIG. 5 is a flow diagram of a process for multi-group end-user security policy generation in an illustrative embodiment. It is to be understood that this particular process is only an example, and additional or alternative processes can be carried out in other embodiments.

In this embodiment, the process includes steps 500 through 506. These steps are assumed to be performed by the processor 120 utilizing its modules 130, 132 and 134.

Step 500 includes ranking a set of multiple end-user device groups within at least one enterprise, wherein each of the multiple end-user device groups is associated with one or more security-related policy settings. Additionally, in at least one embodiment, the multiple device groups are distinguished on one or more of a geographic basis, an operating system basis, and a substantive task-related basis. Also, one or more embodiments include defining the one or more security-related policy settings associated with each of the multiple end-user device groups.

Step 502 includes assigning a given end-user device to two or more of the multiple end-user device groups based at least in part on one or more device parameters attributed to the given end-user device. Step 504 includes generating a policy for the given end-user device by performing partial policy determinations across the two or more end-user device groups to which the given end-user device is assigned, wherein performing the partial policy determinations comprises defining, in an order based at least in part on the ranking of the multiple end-user device groups, security-related settings from the two or more end-user device groups, until all security-related settings required by the policy are defined. In one or more embodiments, performing the partial policy determinations includes performing the partial policy determinations in response to a change to at least one of the one or more device parameters attributed to the given end-user device. Also, performing the partial policy determinations can include performing the partial policy determinations in response to a re-assignment of the given end-user device to two or more of the multiple end-user device groups.

Additionally, in one or more embodiments, one of the multiple end-user device groups is a default group encompassing all end-user devices within the at least one enterprise. Such a default group is associated with all of the security-related settings required by the policy.

Step 506 includes outputting the policy to at least the given end-user device. In at least one embodiment, outputting the policy to at least the given end-user device includes configuring one or more device parameters of the given end-user device in accordance with the policy.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to rank device groups according to a determined priority and perform partial policy determinations across overlapping and/or conflicting group policies. These and other embodiments can effectively define dynamic policy settings based at least in part on the rankings of the groups to which a given device is assigned It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
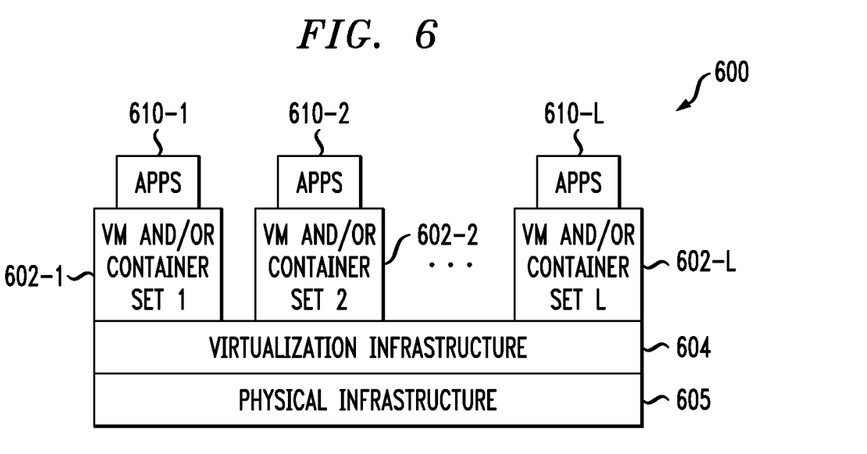
FIGS. 6 and 7 show examples of processing platforms that may be utilized to implement at least a portion of an information processing system in illustrative embodiments.
Figure 7:
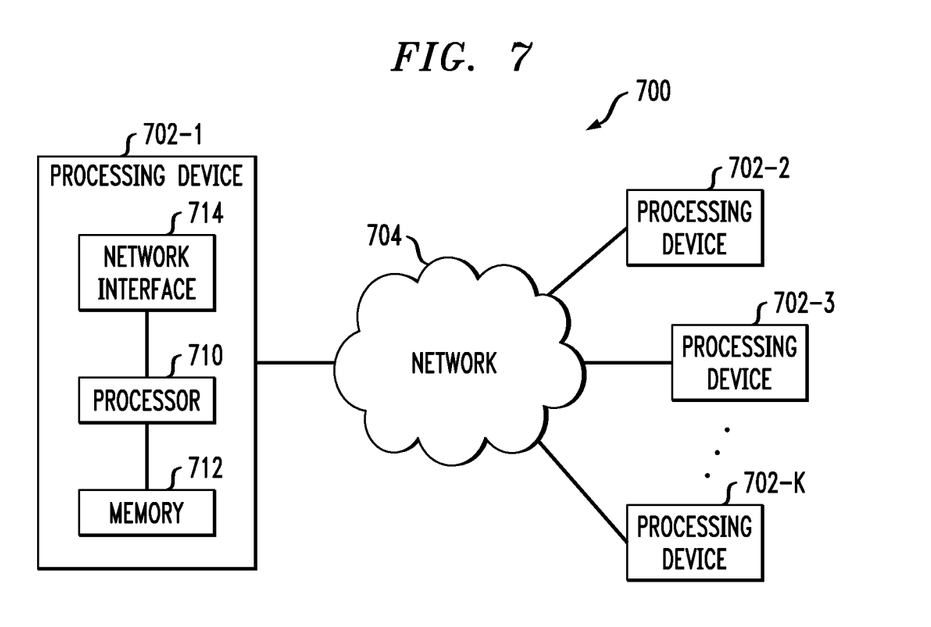

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

An example of a hypervisor platform used to implement a hypervisor within the virtualization infrastructure 604 is the VMware® vSphere® which has an associated virtual infrastructure management system such as the VMware® vCenter™. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   ranking a set of multiple end-user device groups within at least one enterprise, wherein each of the multiple end-user device groups is associated with one or more security-related policy settings;
   assigning a given end-user device to two or more of the multiple end-user device groups based at least in part on one or more device parameters attributed to the given end-user device;
   generating a policy for the given end-user device by performing partial policy determinations across the two or more end-user device groups to which the given end-user device is assigned, wherein performing the partial policy determinations comprises:
      performing the partial policy determinations in response to a change to at least one of the one or more device parameters attributed to the given end-user device; and
      defining, in an order based at least in part on the ranking of the multiple end-user device groups, security-related settings from the two or more end-user device groups, until all security-related settings required by the policy are defined; and
   outputting the policy to at least the given end-user device;
   wherein the method is performed by at least one processing device comprising a processor coupled to a memory.

2. The computer-implemented method of claim 1, wherein outputting the policy to at least the given end-user device comprises configuring one or more device parameters of the given end-user device in accordance with the policy.

3. The computer-implemented method of claim 1, wherein performing the partial policy determinations comprises performing the partial policy determinations in response to a re-assignment of the given end-user device to two or more of the multiple end-user device groups.

4. The computer-implemented method of claim 1, wherein the multiple end-user device groups are distinguished on at least a geographic basis.

5. The computer-implemented method of claim 1, wherein the multiple end-user device groups are distinguished on at least an operating system basis.

6. The computer-implemented method of claim 1, wherein the multiple end-user device groups are distinguished on at least a substantive task-related basis.

7. The computer-implemented method of claim 1, wherein one of the multiple end-user device groups comprises a default group encompassing all end-user devices within the at least one enterprise.

8. The computer-implemented method of claim 7, wherein the default group is associated with all of the security-related settings required by the policy.

9. The computer-implemented method of claim 1, further comprising:
   defining the one or more security-related policy settings associated with each of the multiple end-user device groups.

10. A non-transitory processor-readable storage medium having stored therein program code of one or more software programs, wherein the program code when executed by at least one processing device causes the at least one processing device:
   to rank a set of multiple end-user device groups within at least one enterprise, wherein each of the multiple end-user device groups is associated with one or more security-related policy settings;
   to assign a given end-user device to two or more of the multiple end-user device groups based at least in part on one or more device parameters attributed to the given end-user device;
   to generate a policy for the given end-user device by performing partial policy determinations across the two or more end-user device groups to which the given end-user device is assigned, wherein performing the partial policy determinations comprises:
      performing the partial policy determinations in response to a change to at least one of the one or more device parameters attributed to the given end-user device; and
      defining, in an order based at least in part on the ranking of the multiple end-user device groups, security-related settings from the two or more end-user device groups, until all security-related settings required by the policy are defined; and
   to output the policy to at least the given end-user device.

11. The non-transitory processor-readable storage medium of claim 10, wherein outputting the policy to at least the given end-user device comprises configuring one or more device parameters of the given end-user device in accordance with the policy.

12. The non-transitory processor-readable storage medium of claim 10, wherein performing the partial policy determinations comprises performing the partial policy determinations in response to a re-assignment of the given end-user device to two or more of the multiple end-user device groups.

13. The non-transitory processor-readable storage medium of claim 10, wherein the multiple end-user device groups are distinguished on at least one of a geographic basis, an operating system basis, and a substantive task-related basis.

14. The non-transitory processor-readable storage medium of claim 10, wherein the program code when executed by the at least one processing device causes the at least one processing device:
to define the one or more security-related policy settings associated with each of the multiple end-user device groups.

15. An apparatus comprising:
at least one processing device comprising a processor coupled to a memory;
the at least one processing device being configured:
to rank a set of multiple end-user device groups within at least one enterprise, wherein each of the multiple end-user device groups is associated with one or more security-related policy settings;
to assign a given end-user device to two or more of the multiple end-user device groups based at least in part on one or more device parameters attributed to the given end-user device;
to generate a policy for the given end-user device by performing partial policy determinations across the two or more end-user device groups to which the given end-user device is assigned, wherein performing the partial policy determinations comprises:
performing the partial policy determinations in response to a change to at least one of the one or more device parameters attributed to the given end-user device; and
defining, in an order based at least in part on the ranking of the multiple end-user device groups, security-related settings from the two or more end-user device groups, until all security-related settings required by the policy are defined; and
to output the policy to at least the given end-user device.

16. The apparatus of claim 15, wherein outputting the policy to at least the given end-user device comprises configuring one or more device parameters of the given end-user device in accordance with the policy.

17. The apparatus of claim 15, wherein performing the partial policy determinations comprises performing the partial policy determinations in response to a re-assignment of the given end-user device to two or more of the multiple end-user device groups.

18. The apparatus of claim 15, wherein the multiple end-user device groups are distinguished on at least one of a geographic basis, an operating system basis, and a substantive task-related basis.

19. The apparatus of claim 15, wherein one of the multiple end-user device groups comprises a default group encompassing all end-user devices within the at least one enterprise.

20. The apparatus of claim 15, wherein the at least one processing device is further configured:
to define the one or more security-related policy settings associated with each of the multiple end-user device groups.

* * * * *